United States Patent
Katta

(10) Patent No.: US 11,435,318 B2
(45) Date of Patent: Sep. 6, 2022

(54) SAMPLE LIQUID SENSOR DEVICE

(71) Applicant: KYOCERA CORPORATION, Kyoto (JP)

(72) Inventor: Hiroshi Katta, Kashihara (JP)

(73) Assignee: KYOCERA CORPORATION, Kyoto (JP)

( * ) Notice: Subject to any disclaimer, the term of this patent is extended or adjusted under 35 U.S.C. 154(b) by 110 days.

(21) Appl. No.: 17/100,209

(22) Filed: Nov. 20, 2020

(65) Prior Publication Data

US 2021/0072189 A1 Mar. 11, 2021

Related U.S. Application Data

(63) Continuation of application No. 15/545,641, filed as application No. PCT/JP2016/052058 on Jan. 25, 2016, now Pat. No. 10,871,470.

(30) Foreign Application Priority Data

Jan. 23, 2015 (JP) .................... 2015-011424

(51) Int. Cl.
*G01N 29/02* (2006.01)
*G01N 29/036* (2006.01)

(52) U.S. Cl.
CPC ......... *G01N 29/022* (2013.01); *G01N 29/036* (2013.01); *G01N 2291/0423* (2013.01)

(58) Field of Classification Search
CPC ............... G01N 29/022; G01N 29/036; G01N 2291/0423
See application file for complete search history.

(56) References Cited

U.S. PATENT DOCUMENTS

2007/0145862 A1* 6/2007 Kimura ............... G01N 29/022
310/340
2008/0241933 A1 10/2008 Barker et al.

FOREIGN PATENT DOCUMENTS

JP 2014112084 A 6/2014
WO 2006010206 A1 2/2006

OTHER PUBLICATIONS

International Search Report dated Mar. 15, 2016 in corresponding International Application No. PCT/JP2016/052058.

* cited by examiner

*Primary Examiner* — Jennifer Wecker
*Assistant Examiner* — Michael Paul Shimek
(74) *Attorney, Agent, or Firm* — Duane Morris LLP

(57) ABSTRACT

A specimen liquid sensor apparatus includes a specimen liquid sensor having an external terminal and a reader on which the specimen liquid sensor can be detachably attached. The reader includes a first portion, a second portion that can be displaced with respect to the first portion. A connection terminal located on an upper surface of the first portion, and an external terminal of the specimen liquid sensor and a connection terminal of the reader are in contact with each other in a closed state in which the specimen liquid sensor is located between an upper surface of the first portion and a lower surface of the second portion.

9 Claims, 12 Drawing Sheets

SAMPLE LIQUID SENSOR DEVICE

TECHNICAL FIELD

The present invention relates to a specimen liquid sensor device.

BACKGROUND ART

In a sensor device of Patent Document 1, a detection unit is inserted into and removed from a slot portion of a reader that also serves as a casing. In the inside of the reader, there is a plate-like member having a spring-type hinge mechanism, and the plate-like member has a printed wiring board. Then, the detection unit is inserted into the inside of the reader, and then the sliding button of the casing is moved, and thereafter, the plate-like member positioned above is rotated about the hinge, so that the printed wiring board of the plate-like member and the detection unit are fixed so that the printed wiring board of the plate-like member and the detection unit are in electrical connection with each other.

RELATED ART DOCUMENT

Patent Document

Patent Document 1: Specification of United States Patent Application Publication No. 2008/0241933

SUMMARY OF THE INVENTION

A specimen liquid sensor apparatus according to one embodiment of the present invention comprises a specimen liquid sensor comprising an external terminal and a reader on which the specimen liquid sensor can be detachably attached. The reader comprises a first portion, a second portion that can be displaced with respect to the first portion, and a connection terminal located on an upper surface of the first portion. An external terminal of the specimen liquid sensor and a connection terminal of the reader are in contact with each other in a closed state in which the specimen liquid sensor is located between an upper surface of the first portion and a lower surface of the second portion.

EMBODIMENTS FOR CARRYING OUT THE INVENTION

Hereinafter, a specimen liquid sensor apparatus according to an embodiment of the present invention will be described in details with reference to the drawings.

First Embodiment

Figure 1A:
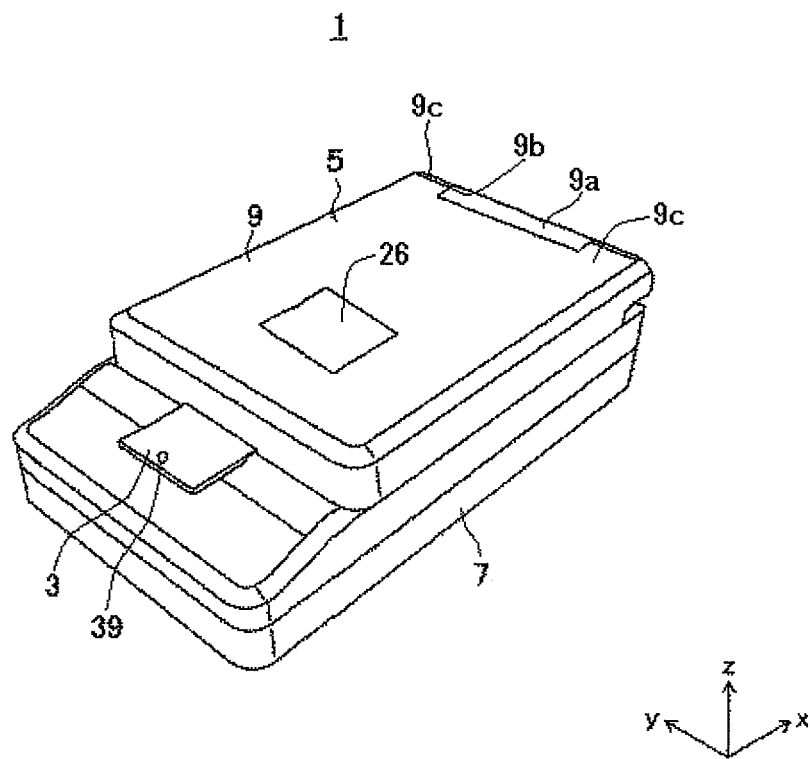
FIGS. 1(a) and 1(b) are perspective views illustrating a specimen liquid sensor apparatus in a closed state according to a first embodiment of the present invention.
Figure 1B:
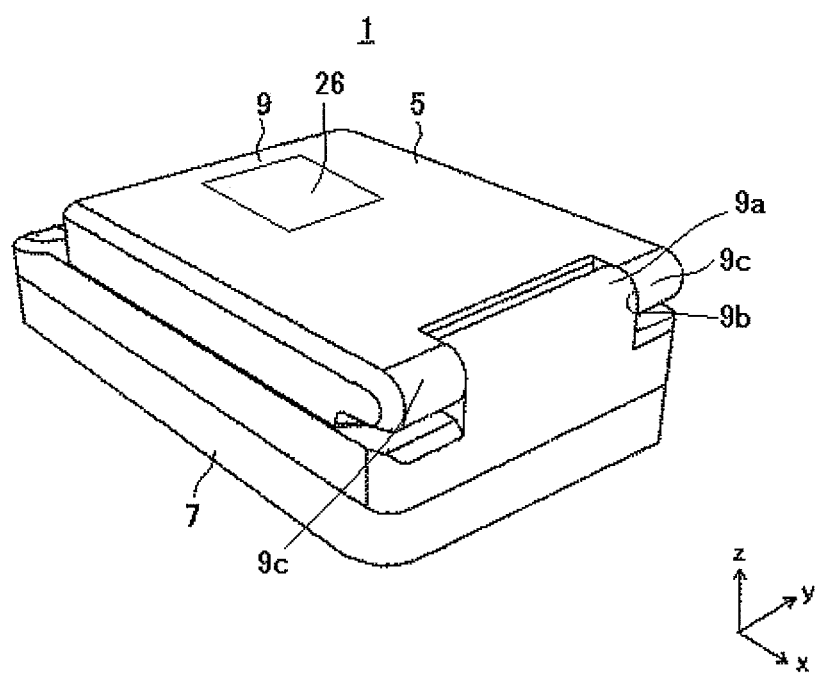
Figure 2A:
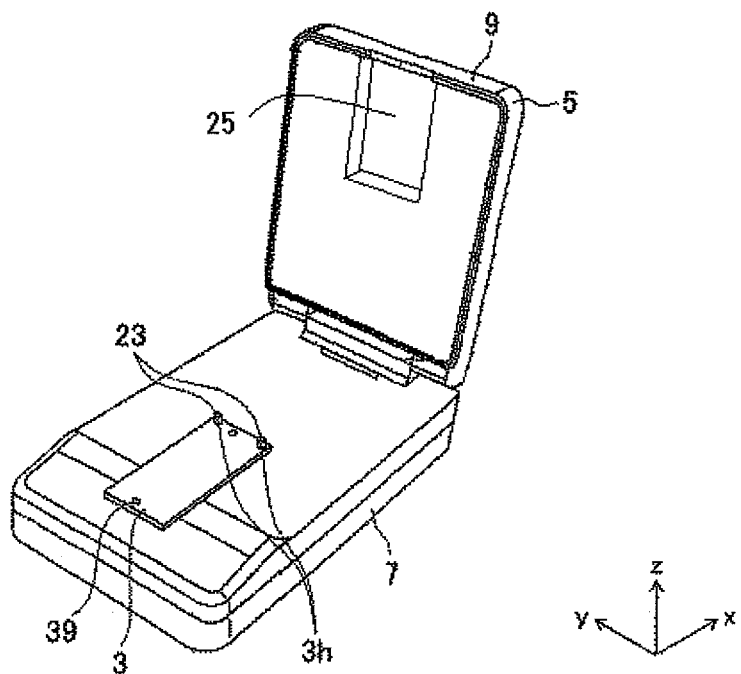
FIGS. 2(a) and 2(b) are perspective views illustrating the specimen liquid sensor apparatus of FIG. 1 in the open state.
Figure 2B:
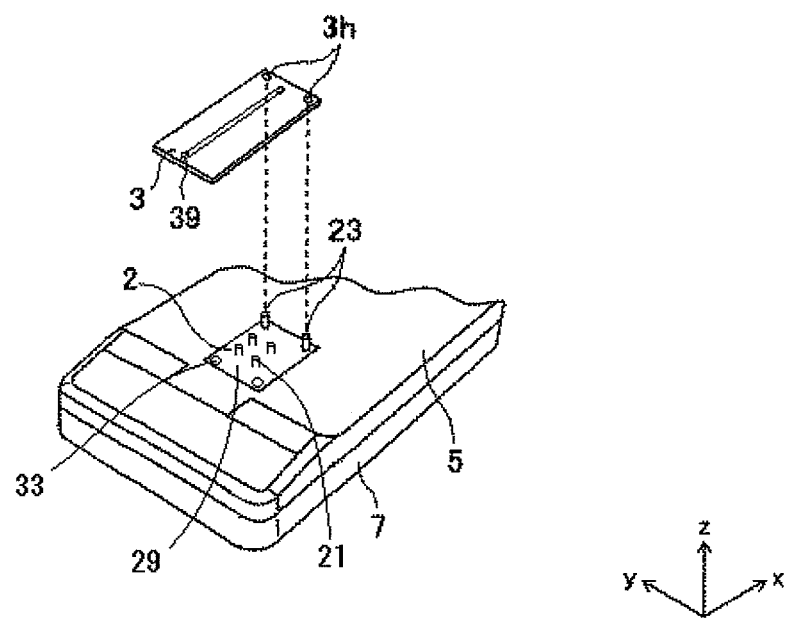

FIGS. 1(a) and 1(b) are perspective views illustrating a specimen liquid sensor apparatus 1 (which may be hereinafter simply referred to as "apparatus 1") in a closed state according to the first embodiment of the present invention. FIG. 2(a) is a perspective view illustrating the apparatus 1 in the open state. FIG. 2(b) is a perspective view illustrating a portion of the apparatus 1 in an open state and in a state before it is mounted on the specimen liquid sensor.

The apparatus 1 according to the present embodiment includes a specimen liquid sensor 3 and a reader 5 on which the specimen liquid sensor 3 is detachably attached.

Reader 5

The reader 5 includes a first portion 7 (for example, fixed portion) and a second portion 9 (for example, movable portion) coupled to be able to transit (able to relatively move) between a closed state as shown in FIG. 1 and an open state as shown in FIG. 2, and includes a connection component 2 including connection terminals 21 located on an upper surface of the first portion 7, positioning pins 23, and a terminal holding member 29 (a contact unit). Both the first portion 7 and the second portion 9 constitute the outline of the reader 5.

The reader 5 is configured so that in the closes state the connection terminal 21 located on the upper surface of the first portion 7 is connected to the external terminal 31 of the specimen liquid sensor 3 detachably sandwiched between the upper surface of the first portion 7 and the lower surface of the second portion 9, and inputs an electric signal from the connection terminal 21 to the external terminal 31, and receives an electric signal that is output from the specimen liquid sensor 3. At this time, the specimen liquid sensor 3 which sucks and accommodates the specimen liquid changes the electric signal received by the specimen liquid sensor 3 according to the property or the component of the specimen liquid and outputs the changed electric signal.

The first portion 7 is placed on a generally horizontal surface such as the upper surface of the desk. One end of the second portion 9 is pivotally connected to the first portion 7, so that the second portion 9 is displaced with respect to the first portion 7. The outer shape of the first portion 7 is, for example, a thin rectangular parallelepiped shape, and houses a circuit board and the like in the inside thereof. The outer shape of the second portion 9 is a thin rectangular parallelepiped shape having a temperature adjusting portion 25 (to be described later) on the lower surface and having a concave portion capable of housing the specimen liquid sensor 3.

In the closed state, the second portion 9 overlaps the upper surface of the first portion 7 to face the first portion 7 (FIGS. 1(a), (b)). In the open state, the second portion 9 moves away from the first portion 7 in the open state than in the closed state (FIG. 2(a)). Therefore, when the reader 5 is in the open state, the surfaces of the first portion 7 and the second portion 9 facing each other are exposed to the outside. When the specimen liquid sensor 3 is placed on the exposed upper surface of the first portion 7, and the second portion 9 is displaced (moved) to make it into a closed state, the specimen liquid sensor 3 is sandwiched between the first portion 7 and the second portion 9 and is attached to the reader 5. When the specimen liquid sensor 3 is to be removed from reader 5, the above procedure may be performed in the opposite order.

In the closed state, the length of the second portion 9 (the length in the longitudinal direction of the specimen liquid sensor 3) may be the same as the length of the first portion 7, but may be shorter than the length of the first portion 7, and in the closed state, the end portion of the first portion 7 at the side opposite to the coupling unit may not overlap the second portion 9 and may be exposed. Furthermore, at least a part of the upper surface of the end portion of the first portion 7 is preferably lower than the surface on which the specimen liquid sensor 3 is placed so that the specimen liquid sensor 3 on the first portion 7 can be easily picked up. In the present embodiment, for example, an inclined surface that is lower than the end portion side of the first portion 7 is provided.

The internal spaces of the first space 7 and the second portion 9 may be connected to each other through the end of each of them. In this case, a flexible signal line constituted by a coaxial thin wire cable or an FPC (Flexible Printed Circuit Board) or the like is inserted, and circuits provided in both portions are connected to each other.

For example, the mode of transition (opening and closing mechanism) between the closed state and the open state of the first portion 7 and the second portion 9 may be a so-called folding type, i.e., the closed state and the open state of the first portion 7 and the second portion 9 are connected rotatably around the rotation axis. For example, as shown in FIGS. 1(a) and 1(b), a first protruding portion 9a protruding in a direction (z direction) opposed to the second portion 9 in the closed state is formed at one end of the first portion 7. On the other hand, a notch 9b in which the first protrusion portion 9a is accommodated is formed at one end of the second portion 9. In other words, a pair of second protrusion portions 9c constituting the notch 9b are formed at the one end of the second portion 9. A hinge member (not shown) is inserted in the first protruding portion 9a and the second protruding portion 9c in the y direction, so that the first portion 7 and the second portion 9 are rotatably connected to each other around a rotation axis parallel to the y direction. A known opening and closing mechanism for mobile phones or notebook type personal computers may be used for such opening and closing mechanism. It should be noted that when the second portion 9 is closed toward the first portion 7, a hinge member (not shown) may have such a mechanism so that the momentum increases in the closing direction around the closed state, or when the second portion 9 is opened from the first portion 7, a hinge member (not shown) may have such a mechanism so that the momentum increases in the opening direction around the open state.

The opening and closing mechanism of the first portion 7 and the second portion 9 is not limited to the case where the ends are connected to each other or fixed using a hinge member or the like as described above. Alternatively, the opening and closing mechanism of the first portion 7 and the second portion 9 may be a method of fitting both of the opening and closing mechanism of the first portion 7 and the second portion 9 existing separately. According to this method, for example, after the specimen liquid sensor 3 is placed on the upper surface of the first portion 7, the second portion 9 is fitted on to the first portion 7 from above, so that the second portion 9 is brought into a closed state. Still alternatively, the upper surface of the first portion 7 and the lower surface of the second portion 9 can be brought into a closed state by inserting the specimen liquid sensor 3 between the upper surface of the first portion 7 and the lower surface of the second portion 9 in a state in which the upper surface of the first portion 7 and the lower surface of the second portion 9 are engaged with each other while the upper surface of the first portion 7 and the lower surface of the second portion 9 face each other.

Although the shape and the material of the first portion 7 and the second portion 9 are not particularly limited, the first portion 7 and the second portion 9 are preferably small and lightweight so that the user can carry the apparatus 1 easily, and, for example, the first portion 7 and the second portion 9 are preferably made of resin such as polyethylene terephthalate (PET).

As shown in FIG. 2(b), the first portion 7 may have a connection component 2 for electrically connecting the specimen liquid sensor 3 and the reader 5 for positioning and fixing the specimen liquid sensor 3.

The positioning pin 23 protrudes from the upper surface of the first portion 7. This positioning pin 23 is provided on the first portion 7 as a connection component 2, but the positioning pin 23 may be integrally formed with, for example, the first portion 7. In the present embodiment, two positioning pins 23 having a circular cross section are provided, but the present invention is not limited thereto, and the number of the positioning pins 23, the arrangement position, the sectional shape, the diameter and the height may be appropriately set.

On the other hand, in the specimen liquid sensor 3, a positioning hole 3h into which the positioning pin 23 is fitted is formed. In the specimen liquid sensor 3, the positioning pin 23 is fitted in the positioning hole 3h, so that the specimen liquid sensor 3 is positioned with respect to the first portion 7 in the direction along the x-y plane (the plane direction along the surfaces of the first portion 7 and the second portion 9 facing each other in the closed state).

Alternatively, in contrast to the above, a downward positioning pin may be provided with the specimen liquid sensor 3 and a positioning hole may be provided on the opposing surface of the first portion 7.

The terminal holding member 29 has a plurality of connection terminals 21 in the upper portion and a circuit terminal 22 connected to the circuit board 28 in the lower portion. The terminal holding member 29 is fixed to the upper surface of the first portion 7 with screws 33 as shown in FIG. 2(b).

The terminal holding member 29 is formed in a generally plate shape as a whole, for example. The planar shape of the terminal holding member 29 is rectangular in the present embodiment, but the terminal holding member 29 may be configured as necessary. Although not specifically shown, the terminal holding member 29 has a plate-like member and wiring connected to the connection terminal 21 and the circuit terminal 22.

Figure 4:
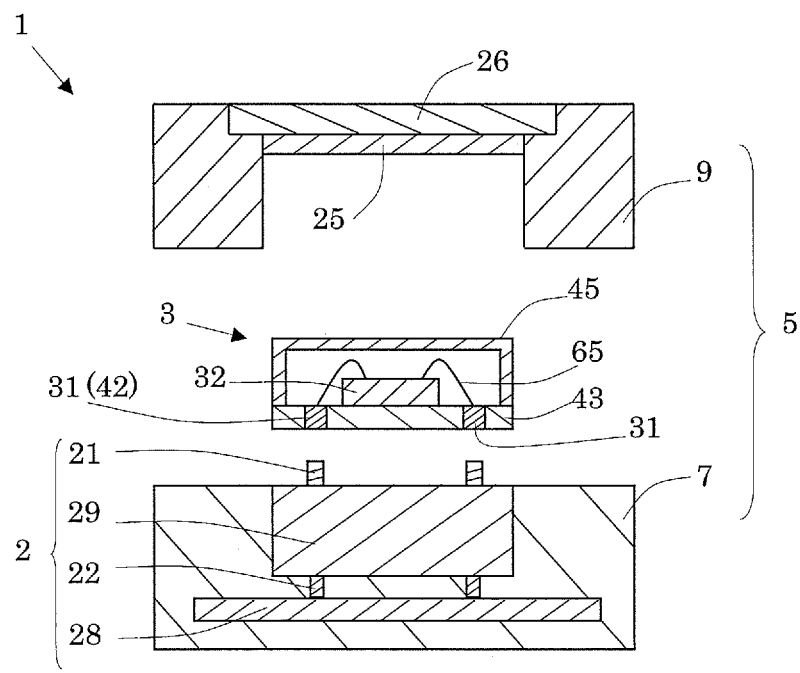
FIG. 4 is a schematic sectional view illustrating the specimen liquid sensor apparatus in FIG. 1 including the specimen liquid sensor illustrated in the cross section taken along line A-A in FIG. 3.

The first portion 7 further has a circuit board 28 below the terminal holding member 29 as shown in FIG. 4. The circuit board 28 and the terminal holding member 29 are connected by the circuit terminal 22. As will be described later, this circuit board 28 detects data of specimen liquid with regard to detection of data of the specimen liquid and transmits and receives this data to and from an external device or the like.

The terminal holding member 29 is fixed to the upper surface of the first portion 7 with the screw 33 and exposed to the outside in the open state of the reader 5. Therefore, without disassembling the first portion 7, the terminal holding member 29 can be easily exchanged in the open state. The number and arrangement of screws 33 may be configured as necessary.

The connection terminal 21 and the circuit terminal 22 are constituted by, for example, a so-called spring pin, and include a contact in a shape of a shaft, a cylinder for holding the contact so as to be movable in the axial direction, and a spring for urging the contact toward the distal side. The connection terminal 21 is installed in the terminal holding member 29 so as to protrude from the surface facing the second portion 9 in the open state.

As shown in FIG. 4, when the specimen liquid sensor 3 is placed on the terminal holding member 29 of the first portion 7, the connection terminal 21 is formed to electrically connect to the external terminal 31 of the specimen liquid sensor 3.

In the closed state, the surfaces of the first portion 7 and the second portion 9 facing each other come into contact with each other through the specimen liquid sensor 3 interposed therebetween. At this time, while the application of excessive compressive force to the specimen liquid sensor 3 is suppressed, the contact pressure with the external terminal 31 is sufficiently ensured with elastic force of the spring pin of the connection terminal 21. The first portion 7 or the second portion 9 may have a cushioning member made of rubber or the like so that one opposing surface comes into abutment with the opposing surface of the casing of the other in the closed state.

As shown in FIG. 2(*a*), the reader 5 may have a temperature adjusting unit 25 capable of at least one of heating and cooling of the specimen liquid sensor 3 in the lower surface of the second portion 9. The temperature adjusting unit 25 is a member including a thermoelectric conversion element such as, for example, Peltier element. The Peltier element has, for example, a semiconductor, electrodes disposed on both sides of the semiconductor, and heat dissipation plates disposed on both sides of the semiconductor.

When a voltage is applied to the Peltier element, heat is transferred from one heat dissipation plate to the other heat dissipation plate, and when the polarities of the voltage are reversed, the direction of movement of the heat is reversed. More specifically, the temperature adjusting unit 25 can both heat and cool the contacted specimen liquid sensor 3.

In the closed state, it is preferable that air is not interposed between the temperature adjusting unit 25 and the specimen liquid sensor 3. More specifically, it is preferable that the heat dissipation plate of the Peltier element is pressed against the specimen liquid sensor 3 and is in contact therewith. The heat dissipation plate is provided with a heat conduction sheet on its surface. The heat conduction sheet has a higher thermal conductivity than the reader 5 (resin), made of an elastic member such as silicone rubber in order to improve the adhesion with the specimen liquid sensor 3.

The temperature adjusting unit 25 including this thermoelectric conversion element (Peltier device) is provided on the lower surface of the second portion 9 (the surface facing the upper surface of the first portion 7), and the thermoelectric conversion element (Peltier device) allows one of the pair of heat dissipation plates (preferably the heat generating surface side) to be exposed through the opening formed in the lower surface of the second portion 9 toward the first portion 7 below.

The temperature adjusting unit 25 may have a display unit 26 on the upper surface (the surface opposite to the first portion 7) in the second portion 9. The display unit 26 is preferably arranged adjacent to the temperature adjusting unit 25 so as to be able to exchange heat therewith, and the display unit 26 is preferable to be mounted on the surface of the second portion 9 where the user can visually recognize the display unit 26. As this display unit 26, for example, the liquid crystal display unit and the like can be mentioned. The display unit 26 displays data detected by the specimen liquid sensor 3 from the specimen liquid. The display unit 26 is adjacent to the cooling surface side of the temperature adjusting unit 25, so that the heat generated by the operation of the display unit 26 can be cooled.

Specimen Liquid Sensor 3

Figure 3:
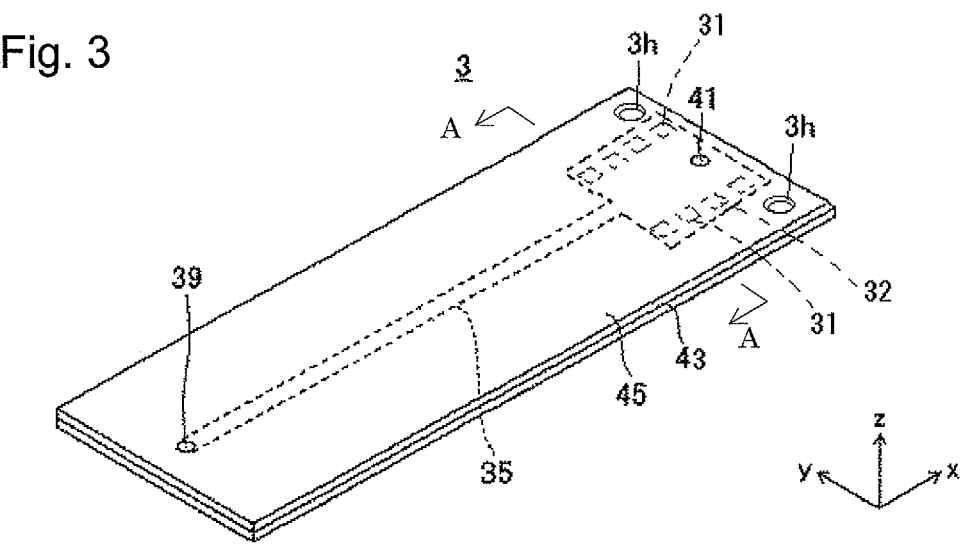
FIG. 3 is a perspective view illustrating the specimen liquid sensor of the specimen liquid sensor apparatus in FIG. 1.

As shown in FIG. 3, the specimen liquid sensor 3 has a base body 43 and a cover 45 arranged on the base body 43, and a flow path 35 is formed between the base body 43 and the cover 45. A sensor unit 32 is formed at the tip of the flow path 35 on the upper surface of the base body 43, and an external terminal 31 is formed on the lower surface of the base body 43 to send data from the sensor unit 32 to the first portion 7.

The shape of the specimen liquid sensor 3 is roughly in the form of a plate as a whole, and, for example, the planar shape of the specimen liquid sensor 3 is a rectangle.

For example, the flow path 35 is formed so as to extend linearly in the longitudinal direction of the specimen liquid sensor 3 (x direction, direction from the portion exposed from the reader 5 to the portion sandwiched by the reader 5). Both ends of the flow path 35 extends to the outside of the specimen liquid sensor 3. One end of the flow path 35 is an inflow port 39 for the taking specimen liquid. The other end of the flow path 35 is an exhaust port 41 for discharging air from the flow path 35 when the specimen liquid flows into the flow path 35. It should be noted that the inflow port 39 and the exhaust port 41 are preferably open to the upper surface (the surface facing the lower surface of the second portion 9) of the specimen liquid sensor 3.

As shown in FIG. 1(*a*), the inflow port 39 is located in the specimen liquid sensor 3 so that the inflow port 39 is exposed from the reader 5 in the closed state. Therefore, the specimen liquid sensor 3 can retrieve the specimen liquid after the specimen liquid sensor 3 is mounted on reader 5. More specifically, the apparatus 1 can measure the specimen liquid at the same time as or immediately after retrieving the specimen liquid. As a result, it is possible to suppress the deterioration of the measurement accuracy due to the change, evaporation, or the like in the property of the specimen liquid.

The flow path 35 is configured to guide the specimen liquid dropped on the inflow port 39 (the specimen liquid in contact with the inflow port 39) to the exhaust port 41 with capillary action. For example, the height (thickness, z direction) of the flow path 35 is set to be relatively low, and wettability of at least one of the bottom surface and the ceiling surface of the flow path 35 is set relatively high.

The height of the flow path 35 in the z direction is not particularly limited, and is preferably 50 µm to 0.5 mm. More preferably, the height of the flow path 35 in the z direction is about 50 µm from the viewpoint of reducing the amount of specimen liquid. It should be noted that when the specimen liquid is undiluted liquid such as blood, the amount of the specimen liquid is not necessarily reduced. The contact angle (wettability) of the specimen liquid (which may be represented by water) on the bottom surface and the ceiling surface of the flow path 35 is less than 90 degrees, and is more preferably less than 60 degrees.

The external terminal 31 is provided on the lower surface side (at the side of the first portion 7) of the specimen liquid sensor 3 so that the external terminal 31 comes into contact with the connection terminal 21 on the first portion 7 when the specimen liquid sensor 3 is sandwiched by the reader 5.

As described above, the inflow port 39 is located at the portion exposed from the reader 5, and therefore, in the long specimen liquid sensor 3, the external terminal 31 is preferably located on the side opposite to the inflow port 39.

For example, the number and the arrangement of such external terminals 31 are such that the external terminals 31 are arranged along flow path 35 on both sides of flow path 35 in the present embodiment, but the present embodiment is not limited thereto, and the number and arrangement of the external terminals 31 are appropriately set according to the circuit configuration inside of the specimen liquid sensor 3 and the like.

In the present embodiment, the base body 43 has insulation properties and penetrates in the thickness direction (vertical direction), as shown in FIG. 4, and the base body 43 has through holes (hereinafter also referred to as through holes) 42 penetrating through the base body 43 in the thickness direction (vertical direction) for forming the external terminals 31. The external terminal 31 located on the lower surface of the base body 43 is electrically connected to the connection terminal 21 of the first portion 7. For example, the material of the base body 43 may be resin or ceramic. The base body 43 may be a multilayer board, such as those having a ground layer as a shield inside. It should be noted that, for example, the planar shape of the base body 43 is similar to the planar shape of the entire specimen liquid sensor 3.

Figure 5A:
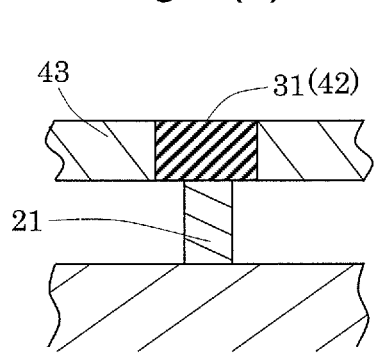
FIGS. 5(a) to 5(c) are schematic cross-sectional views illustrating examples of connections between a connection terminal and an external terminal of the specimen liquid sensor apparatus of the first embodiment.

As shown in FIG. 5(a), the external terminal 31 is filled in the through hole 42 of the base body 43, and is exposed from the opening portion of the lower surface of the base body 43 which is the lower portion of the through hole 42 and is connected to the connection terminal 21. More specifically, the external terminal 31 exposed on the lower surface of the base body 43 and the connection terminal 21 are connected by bringing the formation region of the through hole 42 which is the lower surface of the base body 43 and the connection terminal 21 into contact with each other. For example, the material of the external terminal 31 is made of metal such as copper, nickel, and gold.

Figure 5B:
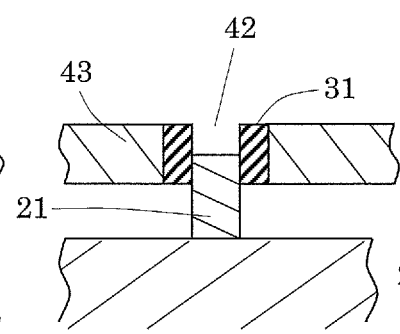
Figure 5C:
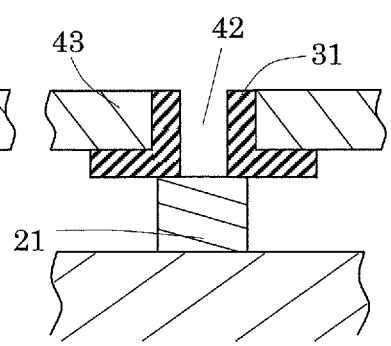

The external terminal 31 may be formed on the inner wall surface of the through hole 42 of the base body 43 as shown in FIG. 5(b), instead of the configuration as shown in FIG. 5(a). The external terminal 31 and the connection terminal 21 can be connected by fitting the connection terminal 21 inside of the through hole 42. Even in the case where the external terminal 31 is formed on the inner wall surface of the through hole 42, the external terminal 31 may be connected to the connection terminal 21 on the lower surface of the base body 43 as described above.

As sown in 5(c), the external terminal 31 may extend to the periphery of the through hole 42 in the lower surface of the base body 43. According to this configuration, the reliability of the connection between the external terminal 31 and the connection terminal 21 can be further improved. In this case, when, for example, the diameter of connection terminal 21 is configured to be larger than the diameter of the through hole 42 or is formed to be at a position in contact with the periphery of the through hole 42, the connection terminal 21 can be connected to the external terminal 31 not only in the formation region of the through hole 42 but also around the through hole 42.

For example, in a method for forming the external terminal 31, when a plurality of base bodies 43 are collectively formed from a single substrate, a conductor may be formed in a thick film with such a pattern including a plurality of through holes 42 provided in the single substrate, and thereafter the conductor may be divided into multiple pieces. In another method, the external terminal 31 may be formed by plating a conductor on a predetermined portion of the base body 43.

For example, the plan shape of the outer shape of the cover 45 is roughly the same as the plan shape of the entire specimen liquid sensor 3. On the lower surface of the cover 45, a groove is formed between the cover 45 and the base body 43 to form the flow path 35. The cover 45 is formed so that the inflow port 39 and the exhaust port 41 described above pass through the cover 45 in the vertical direction. For example, the cover 45 is pasted to the base body 43 with an adhesive.

For example, the cover 45 is made of an insulating material such as resin or ceramic. The entire cover 45 may be integrally formed of the same material. The cover 45 may be formed by stacking a plurality of layered members made of the same material or different materials. For example, the cover 45 may be composed of a layered member having a slit formed as the flow path 35 and a layered member arranged thereon and constituting the ceiling surface of the flow path 35.

At least one of the base body 43 and the cover 45 is preferably made of a material having high hydrophilicity, applied with hydrophilic treatment, or applied with a hydrophilic film pasted thereon, in order to increase the wettability of the inner surface of the flow path 35 in at least the region constituting the flow path 35. For example, a hydrophilic film may be pasted to the base body 43 in a region overlapping with the flow path 35. In this case, the hydrophilic film may be considered to be a part of the base body 43. For example, as described above, in the case where the cover 45 is formed by stacking layered members, the upper layered member which closes the slit may be constituted by a hydrophilic film.

It should be noted that the entire specimen liquid sensor 3 preferably does not have flexibility. For example, at least one of the base body 43 and the cover 45 preferably does not have flexibility.

Figure 6:
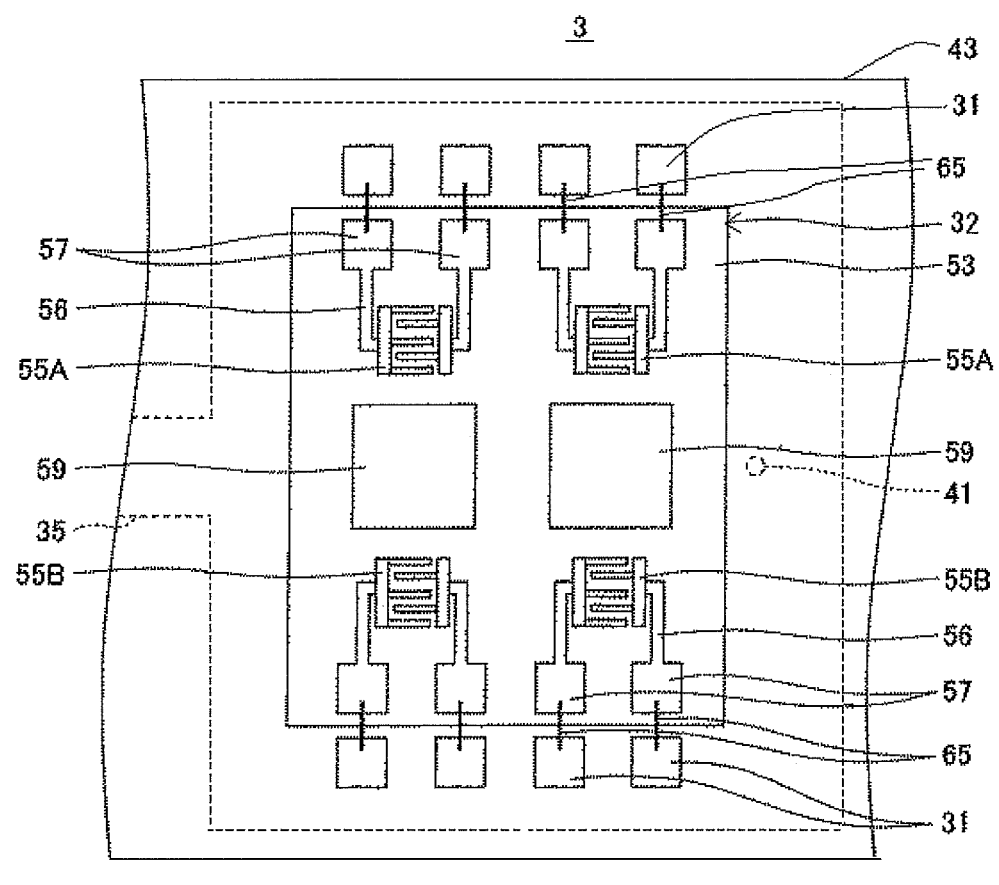
FIG. 6 is a plan view illustrating a portion of the specimen liquid sensor in FIG. 1.

FIG. 6 is a plan view illustrating a portion of the specimen liquid sensor 3 with the cover 45 removed from the specimen liquid sensor 3.

In the specimen liquid sensor 3, the sensor unit 32 that is configured to detect the detection target contained in the specimen liquid passing through the flow path 35 is mounted on the upper surface of the base body 43. The sensor unit 32 is a sensor chip which substantially converts a signal corresponding to the specimen liquid, and the base body 43 and the cover 45 function as a package which contributes to improvement of the ease of handling of the sensor unit 32 and the like. Although not specifically shown, at least one of the lower surface of the cover 45 and the upper surface of the base body 43 is formed with a recessed portion for accommodating the sensor unit 32.

The sensor unit 32 includes a piezoelectric substrate 53, a first IDT 55A which generates a surface acoustic wave (SAW) on the main surface of the piezoelectric substrate 53, a second IDT 55B for receiving the SAW, a plurality of chip pads 57 provided for inputting an electric signal to the first IDT 55A or outputting an electric signal from the second IDT 55B, and a reactor 59 for changing the SAW according to the property or the component of the specimen liquid. Hereinafter, for example, in the following explanation, a metal film is provided on the surface of the piezoelectric substrate 53 as a reactor unit 59.

The piezoelectric substrate 53 is made of a single crystal substrate having a piezoelectric property such as, for example, monocrystalline lithium tantalate ($LiTaO_3$), monocrystalline lithium niobate ($LiNbO_3$), quartz. The planar shape and various dimensions of the piezoelectric substrate 53 may be appropriately set. For example, the thickness of the piezoelectric substrate 53 is 0.3 mm to 1.0 mm. The piezoelectric substrate 53 is arranged so that its principal plane is parallel to the base body 43.

The first IDT 55A and the second IDT 55B (hereinafter simply referred to as "IDTs", which may not be distinguished from each other) are made of conductor layers located on the upper surface of the piezoelectric substrate 53. The first IDT 55A and the second IDT 55B are opposed to each other with the metal film 59 interposed therebetween. Each IDT 55 has a pair of interdigital electrodes. Each comb tooth electrode has a bus bar and a plurality of electrode fingers extending from the bus bar. The pair of comb tooth electrodes are arranged so that a plurality of electrode fingers mesh with each other. The first IDT 55A and the second IDT 55B are spaced apart from each other in the propagation direction of the SAW and constitute a transversal type IDT.

The frequency characteristics can be designed by using, as parameters, the number of electrode fingers of IDT 55, the distance between adjacent electrode fingers, the intersection width of electrode fingers, and the like. The SAW excited by the IDT 55 include Rayleigh wave, Love wave, leaky wave, and the like, and any of them may be used. The sensor unit 32 uses, for example, Love wave.

In the SAW propagation direction (y direction), an elastic member may be provided outside of the first IDT 55A and the second IDT 55B to suppress the reflection of the SAW. For example, the frequency of the SAW can be set in a range of several megahertz (MHz) to several gigahertz (GHz). Particularly, if the frequency of the SAW is several hundred megahertz to 2 gigahertz, the sensor unit 32 is practical, and the size of the piezoelectric substrate 53 can be reduced, and further, the size of the sensor unit 32 can be reduced.

The chip pad 57 is connected to the IDT 55 via the chip wiring 56. For example, like the IDT 55, the chip pad 57 and the chip wire 56 are composed of conductor layers located on the upper surface of the piezoelectric substrate 53. The chip pad 57 connected to the first IDT 55A is located at the first IDT 55A at the side opposite to the second IDT 55B. The chip pad 57 connected to the second IDT 55B is located at the second IDT 55B at the side opposite to the first IDT 55A. The chip pad 57 preferably overlaps the IDT 55 as seen in the opposing direction (y direction) of the first IDT 55A and the second IDT 55B in order to reduce the arrangement range of the plurality of chip pads 57 in the x direction while securing a wide area of each chip pad 57.

For example, the IDT 55, the chip wire 56, and the chip pad 57 are made of gold, aluminum, an alloy of aluminum and copper, or the like. These electrodes may have a multilayer structure. In the case of a multilayer structure, for example, the first layer is made of titanium or chromium, and the second layer is made of aluminum or an aluminum alloy. These thicknesses thereof are, for example, 100 nm to 300 nm.

The upper surface of the piezoelectric substrate 53 may be covered with a protective film (not shown) from above the IDT 55 and the chip wire 56. The protective film contributes to the suppression of oxidation of the IDT 55 and the chip wire 56, and the like. The protective film is made of silicon oxide, aluminum oxide, zinc oxide, titanium oxide, silicon nitride, silicon, or the like. In the specimen liquid sensor 3, silicon dioxide ($SiO2$) is used as the protective film. The protective film is formed on the entire upper surface of the piezoelectric substrate 53 so that, for example, the chip pad 57 is exposed. The thickness of the protective film (the height from the upper surface of the piezoelectric substrate 53) is more than the thickness of, for example, the IDT 55, and is 200 nm to 10 μm.

The metal film 59 is positioned between the first IDT 55A and the second IDT 55B on the protective film. The metal film 59 is located in the flow path 35. The metal film 59 has a two-layer structure including, for example, titanium and gold deposited on the titanium, or chrome and gold deposited on the chromium. For example, an aptamer composed of a nucleic acid and a peptide is immobilized on the surface of the metal film 59.

When the specimen liquid comes into contact with the metal film 59 to which the aptamer is fixed, a specific target substance in the specimen liquid is bound with the aptamer corresponding to the target substance, and the weight of the metal film 59 changes. As a result, there is a change in the phase characteristics and the like of the SAW propagating from the first IDT 55A to the second IDT 55B. Therefore, the properties or components of the specimen liquid can be found based on the change in the phase characteristics and the like.

An appropriate number of combinations of the first IDT 55A, the second IDT 55B, and the metal film 59 may be provided in the flow path direction of the flow path 35. In the present embodiment, for example, two combinations are provided. In such case, while the aptamer is fixed on a set of metal films, the aptamer is not fixed on another set of metal films, and the change in the SAW due to the bonding between the specimen liquid and the aptamer by comparing both of them. Different types of aptamers may be fixed for each of the metal films and different properties or components may be measured with regard to the specimen liquid.

Although not specifically shown, in the upper surface (under the protective film) of the piezoelectric substrate 53, a short-circuit electrode, in an electric floating state or having a ground potential applied thereto, in the form of a solid electrode may be provided between the first IDT 55A and the second IDT 55B. When the short circuit electrode is provided, loss of the SAW can be reduced depending on the type of the SAW. It is considered that, in particular, the loss suppression effect with the short circuit electrode is high when using leaky wave as the SAW.

Although not specifically shown, a space is formed on the IDT 55 so that propagation of the SAW (vibration of the piezoelectric substrate 53) can be suitably performed. It is preferable that the space is designed so that specimen liquid does not enter into the space. For example, the space is formed by forming a recess separated from the flow path 35 at the lower surface of the cover 45. For example, the space is constituted by a member provided so as to cover the IDT 55 as a part of the sensor unit 32.

In the flow path 35, the width (y direction) from the inflow port 39 to the front of the metal film 59 is preferably equal to or less than the width (y direction) on the metal film 59. In this case, while the total amount of specimen liquid is decreased, the amount of specimen liquid substantially provided for measurement can be increased. For example, in the case where the width of the flow path 35 on the metal film 59 is about 3 mm, the width before the flow path is preferably 50 μm to 3 mm, and, more preferably, 50 μm to 1 mm, and further more preferably about 50 μm.

The method of mounting the sensor unit 32 on the base body 43 may be appropriately adopted. In the present embodiment, the mounting method of the sensor unit 32 is a surface mounting using the bonding wire 65. When the specimen liquid sensor has a sensor unit, the mounting method of the sensor unit is not limited to the surface mounting using the wire bonding. For example, the mounting method may be a flip chip mounting using a bump, or a lead insertion mounting method in which a lead is inserted into a substrate.

In the sensor unit 32, the IDT 55 (the first IDT 55A and the second IDT 55B) is connected to the chip pad 57 via the chip wire 56, and this chip pad 57 is connected to the external terminal 31 via the bonding wire 65.

Although not specifically shown, a recess is formed in the lower surface of the cover 45 in the periphery of the chip pad 57 of the sensor unit 32, and the space where the bonding wire 65 is arranged is appropriately configured.

Figure 7:
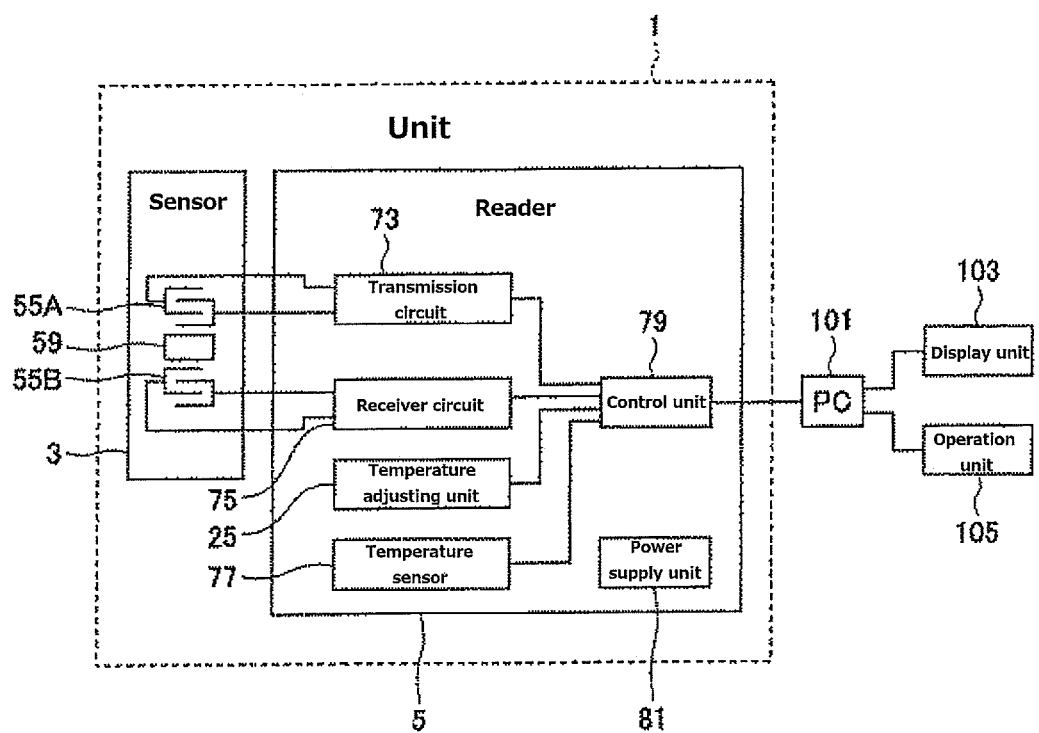
FIG. 7 is a block diagram illustrating a configuration of a signal processing system of the specimen liquid sensor apparatus in FIG. 1.

FIG. 7 is a block diagram illustrating a configuration of a signal processing system of the apparatus 1.

The apparatus 1 (the reader 5) is used by being connected to a personal computer (PC) 101, for example. Although not specifically shown, for the connection with the PC 101, a connector based on a predetermined standard is appropriately provided in the reader 5. The PC 101 is connected to the interface such as, for example, the display unit 103 and the operation unit 105. It should be noted that the display unit 103 and the operation unit 105 may constitute a touch panel.

For example, the PC 101 displays information prompting the user to perform operation on the display unit 103, and outputs a control signal to the reader 5 based on the user operation with the operation unit 105. According to the control signal from the PC 101, the reader 5 inputs an electric signal to the specimen liquid sensor 3. The reader 5 performs appropriate processing such as amplification, filtering, or AD conversion on the electric signal output from the specimen liquid sensor 3, and outputs the processed electric signal to the PC 101. The PC 101 causes the display unit 103 to display the property or component information about the specimen liquid based on the electric signal from the reader 5.

The reader 5 includes at least a transmission circuit 73 configured to generate an electric signal input to the first IDT 55A, a receiver circuit 75 configured to receive an electric signal that is output from the second IDT 55B, a temperature adjusting unit 25 as described above, a temperature sensor 77, a control unit 79 configured to carry out these controls and the like, and a power supply unit 81 configured to supply power thereto.

For example, the transmission circuit 73 is constituted by an IC and the like and includes a radio frequency circuit. The transmission circuit 73 is configured to generate an AC signal having a frequency and a voltage according to the signal from the control unit 79 and inputs the AC signal into the first IDT 55A.

The receiver circuit 75 is constituted by, for example, an IC, and he like, and includes an amplifier circuit, a filter, or an AD conversion circuit. The receiver circuit 75 performs appropriate processing on the electric signal output from the second IDT 55B and outputs the electric signal to the control unit 79.

The control unit 79 includes a CPU, a ROM, a RAM, and the like. The transmission circuit 73 and the receiver circuit 75 are driven based on the control signal from the PC 101. The control unit 79 controls feedback control of the temperature adjusting unit 25 so that the temperature detected by the temperature sensor 77 constituted by a resistance type contact type temperature sensor such as, for example, a thermistor converges to a predetermined target value. For example, the target value is input from the PC 101.

The power supply unit 81 includes an inverter or a converter and converts the power from the commercial power supply or the PC 101 into an appropriate voltage, and transmits the power to the transmission circuit 73, the receiver circuit 75, the temperature adjusting unit 25, the temperature sensor 77 and the control unit 79.

The temperature sensor 77 may be provided. This temperature sensor 77 is constituted by a contact type temperature sensor of a resistance type such as, for example, a thermistor, and is provided in the vicinity of the position where the specimen liquid sensor 3 is placed, and an electric signal corresponding to the surrounding temperature is output to the control unit 79.

As described above, in the present embodiment, the apparatus 1 includes the specimen liquid sensor 3 having the external terminal 31 and the reader 5 on which the specimen liquid sensor 3 is detachably attached. The reader 5 has the first portion 7 constituting the outline of the reader 5 and the second portion 9 connected to the first portion 7 so as to be movable. In the closed state in which the second portion 9 is the closest to the first portion 7, the second portion 9 is configured so that the connection terminal 21 provided on the upper surface of the first portion 7 is in contact with the external terminal 31 of the specimen liquid sensor 3 sandwiched between the temperature adjusting unit 25 on the lower surface of the second portion 9 and the upper surface of the first portion 7.

More specifically, in the present embodiment, the specimen liquid sensor 3 is not inserted in the reader but is sandwiched by the reader 5. Various effects are provided depending on the attachment and detachment method of the specimen liquid sensor 3.

For example, in a conventional insertion type unit, the specimen liquid sensor needs a certain degree of rigidity so as not to bend when inserted. In contrast, in the present embodiment, such rigidity is unnecessary, and a specimen liquid sensor 3 having flexibility such as a film can be used. Therefore, the freedom of the design of the specimen liquid sensor 3 is improved, and the cost of the specimen liquid sensor 3 is expected to be reduced.

For example, since the connection terminal 21 is exposed to the outside when the user simply moves the reader 5 to the open state, the apparatus can easily examine abrasion, deformation, misalignment or the like of the connection terminal 21 without disassembling the casing of the reader 5. For example, a configuration in which the connection component 2 is exchanged without decomposing reader 5 may also be adopted. For example, in the reader 5, the weight of the second portion 9 can be used to secure the contact pressure between the external terminal 31 and the connection terminal 21.

For example, in the case where the second portion 9 has the temperature adjusting unit 25, the force sandwiching the specimen liquid sensor 3 in the reader 5 in the closed state can be used as the force of bringing the specimen liquid sensor 3 into close contact with (pressed against) the temperature adjusting unit 25. As a result, the heat transfer efficiency can be improved with a simple configuration. For example, the force sandwiching the specimen liquid sensor 3 can be generated by the weight of the second portion 9, the urging force of the coupling mechanism between the first portion 7 and the second portion 9, the pressing force of the user, or the like.

As described above, according to the specimen liquid sensor apparatus 1 of the first embodiment, the external terminal 31 of the specimen liquid sensor 3 comes in contact with the connection terminal of the first portion 7 which is one side of the reader 5, miniaturization can be realized with a simple configuration. More specifically, according to the first embodiment, there is no need to make electric connection with the detection unit with a complicated mechanism and configuration such as a hinge mechanism and a slide button. Therefore, the electric connection can be secured stably, and the size of the sensor apparatus can be reduced.

Second Embodiment

Figure 8:
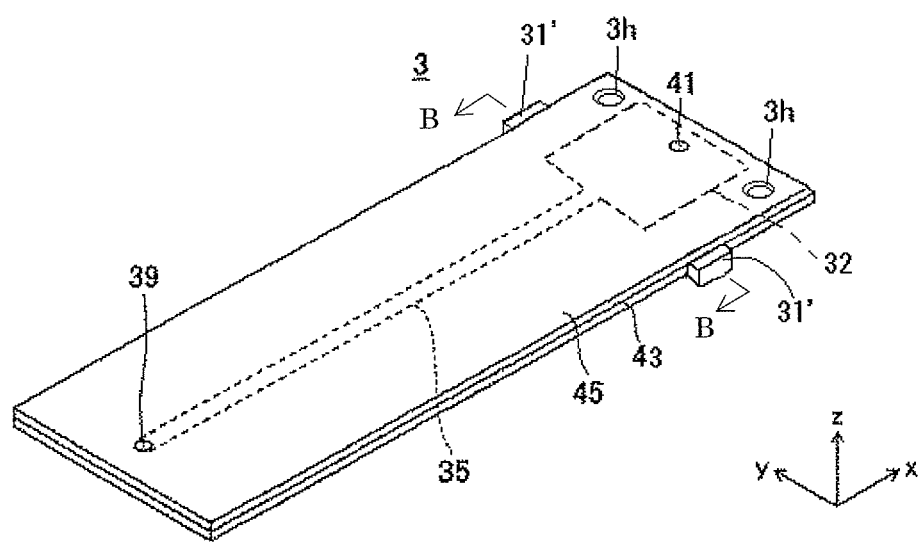
FIG. 8 is a perspective view illustrating the specimen liquid sensor of the specimen liquid sensor apparatus according to a second embodiment of the present invention.
Figure 9:
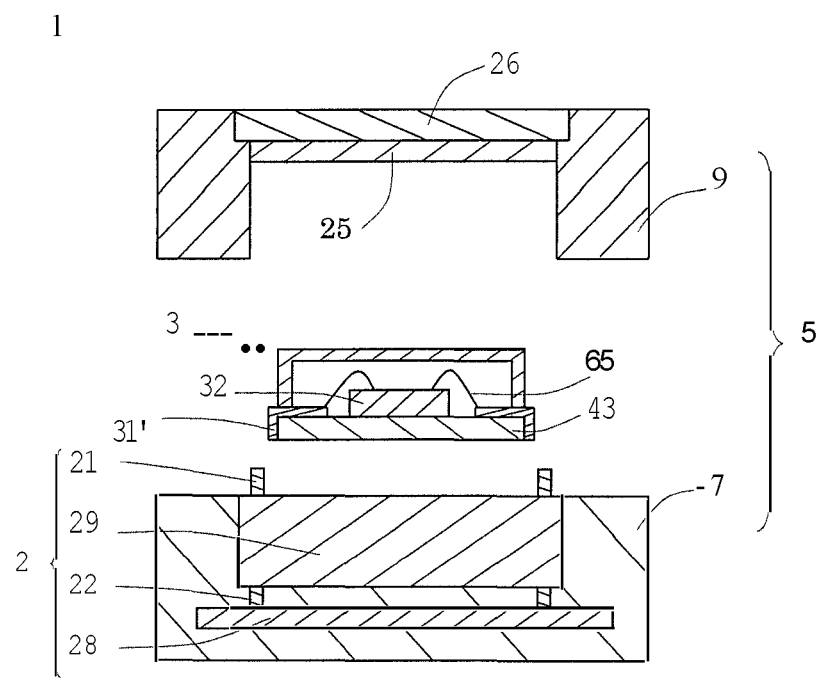
FIG. 9 is a schematic sectional view illustrating the specimen liquid sensor apparatus including the specimen liquid sensor indicated by a cross section taken along line B-B in FIG. 8.
Figure 10A:
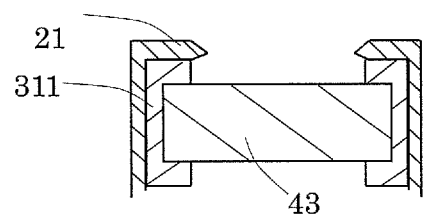
FIGS. 10(a) to 10(c) are schematic cross-sectional views illustrating examples of connections between a connection terminal and an external terminal of the specimen liquid sensor apparatus of the second embodiment.
Figure 10B:
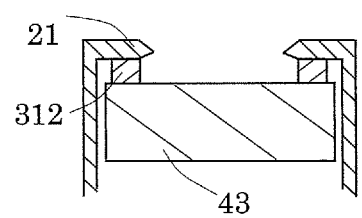
Figure 10C:
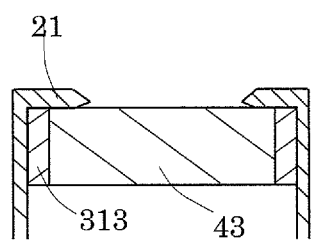

FIG. 8, FIG. 9, and FIG. 10(*a*) to FIG. 10(*c*) illustrate the specimen liquid sensor apparatus according to the second embodiment of the present invention.

Unlike the above embodiment, in the specimen liquid sensor apparatus according to the present embodiment, on an upper surface and/or side surface of a base body 43, an external terminal 31' of a specimen liquid sensor 3 is connected to a connection terminal 21 of a first portion 7 of a reader 5.

In FIG. 8 and FIG. 9, the specimen liquid sensor 3 has the external terminal 31' formed from a conductor on the upper surface and the side surface of the base body 43. At this occasion, as shown in FIG. 9, the external terminal 31' is configured so that the portion located on the side surface of the base body 43 is connected to the connection terminal 21 of the reader 5 in the closed state. In this way, the external terminal 31' connects to the connection terminal 21 of the first portion 7 in the closed state like the external terminal 31 according to the above-described embodiment. It is possible to input and output electric signals between the connection terminal 21 of the reader 5 and the external terminal 31' of the specimen liquid sensor 3. This makes it possible to reduce the size of the specimen liquid sensor apparatus.

In this case, the form as shown in FIG. 10 can be adopted as the connection method between the external terminal 31' of the specimen liquid sensor 3 and the connection terminal 21 of the first portion 7 of the reader 5. More specifically, the connection terminal 21 of the first portion 7 of the reader 5 can be connected to the external terminal 31' of the specimen liquid sensor 3 so as to be caught on the upper surface and/or the side of the base body 43 of the specimen liquid sensor 3. It should be noted that a connection terminal 21' can have a shape obtained by bending the upper portion.

FIG. 10(*a*) illustrates a case where a connection is made between the connection terminal 21' and an external terminal 311 formed from the upper surface, the side surface, and to the lower surface of the base body 43. At this occasion, the connection terminal 21' is connected to, in the external terminal 311, the portions of the upper surface and the side surface of the base body 43, and therefore, the contact area increases, so that the contact resistance can be reduced.

FIG. 10(*b*) illustrates a case where the connection terminal 21' and the external terminal 312 located on the upper surface of the base body 43 are connected with each other. At this occasion, the connection terminal 21' and the external terminal 312 can be connected without providing the external terminal 312 on the side surface and the lower surface of the base body 43.

FIG. 10(*c*) illustrates a case where the external terminal 313 formed on the side surface of the base body 43 and the connection terminal 21' are connected. According to this configuration, the external terminal 313 is provided on the side surface of the base body 43, and therefore, the connection between the external terminal 313 and the connection terminal 21' can be made on the side surface of the base body 43.

The specimen liquid sensor 3 may have both of the external terminal 31 formed in the through hole 42 of the base body 43 according to the first embodiment and the external terminal 31' formed on the outer surface of the base body 43 according to the present embodiment. In this case, the distance between the external terminals 31, 31' can be increased, so that the parasitic inductor and the resistance component can be effectively reduced.

Third Embodiment

Figure 11A:
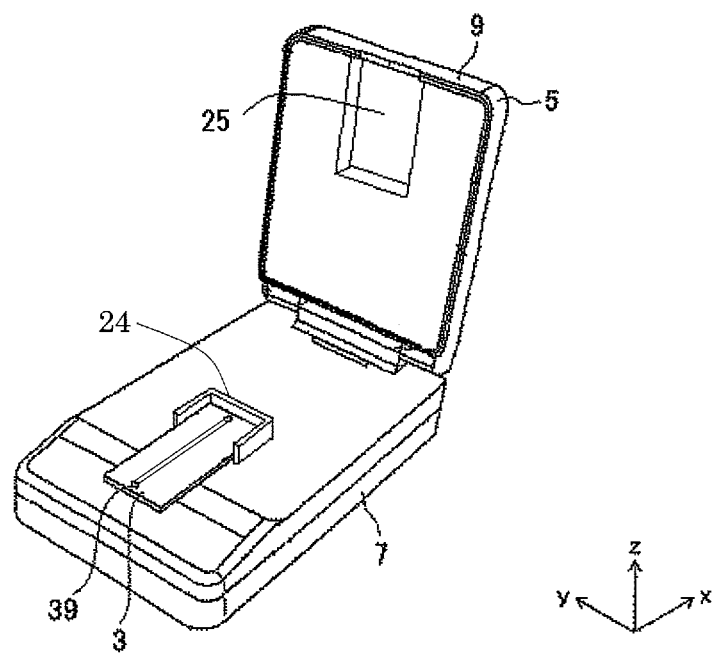
FIGS. 11(a) and 11(b) are perspective views illustrating the specimen liquid sensor apparatus according to the third embodiment of the present invention in the open state.
Figure 11B:
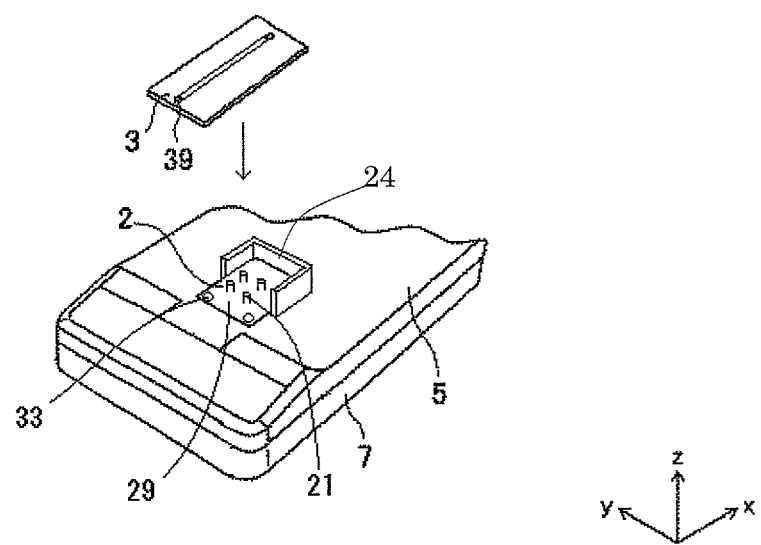

FIG. 11 illustrates a specimen liquid sensor apparatus according to the third embodiment of the present invention.

In the first and second embodiments described above, a positioning hole 3*h* provided in a specimen liquid sensor 3 is fitted in a positioning pin 23 provided in a first portion 7 of a reader 5, so that the specimen liquid sensor 3 is placed in the first portion 7 of the reader 5.

In contrast, as shown in FIG. 11(*a*), in the specimen liquid sensor apparatus according to the present embodiment, a guide member 24 is provided in the first portion 7 of the reader 5, and the specimen liquid sensor 3 is brought into contact with the guide member 24, so that the specimen liquid sensor 3 can be placed in the first portion 7 of the reader 5. At this occasion, the specimen liquid sensor 3 may be placed in the guide member 24 from above as shown in FIG. 11(*b*) or from the side. When the specimen liquid sensor 3 is placed from the side, for example, the specimen liquid sensor 3 may be inserted between the first portion 7 and the second portion 9 into the guide member 24 while the first portion 7 and the second portion 9 are engaged with each other. When the first portion 7 and the second portion 9 are in the open state, the specimen liquid sensor 3 may be placed from the side.

According to the specimen liquid sensor apparatus of the present embodiment, the specimen liquid sensor 3 can be easily set by merely bringing the end of the specimen liquid sensor 3 into contact with the guide member 24 of the first portion 7 of the reader 5. The specimen liquid sensor 3 can be positioned by the guide member 24 of the first portion 7 of the reader 5 without forming the positioning pin 23 in the second portion 9 and without forming the positioning hole 3*h* in the specimen liquid sensor 3. For example, the guide member 24 may be configured as a spring shape, or at least a part of the guide member 24 may be accommodated inside of the first portion 7 by a pressing force or the like in the closed state.

It is to be noted that the present invention is not limited to the above embodiments, and various modifications and improvements are possible within the scope described in the claims.

Figure 12:
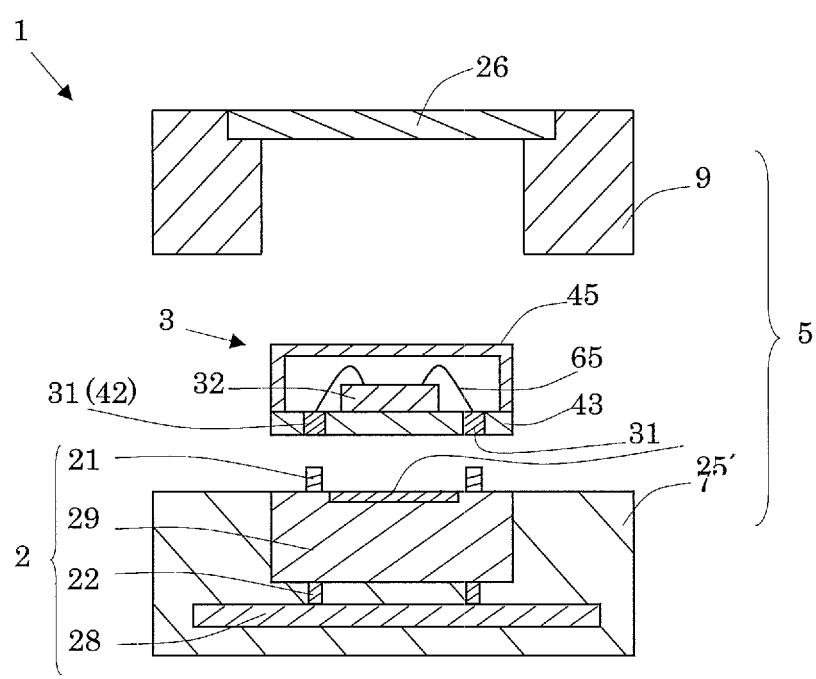
FIG. 12 is a schematic sectional view illustrating a specimen liquid sensor apparatus according to another embodiment including a specimen liquid sensor.

For example, in the embodiments, the temperature adjusting unit 25 is provided in the second portion 9 of the reader 5, but the temperature adjusting unit 25 maybe provided in the first portion 7. As shown in FIG. 12, a temperature adjusting unit 25' may be provided in a region between a pair of connection terminals 21, 21 on the upper surface of the first portion 7. According to this configuration, the main components are provided in the first portion 7 of the reader 5, and the electric circuit can be made into a simple configuration in the second portion 9 of the reader 5.

Figure 13:
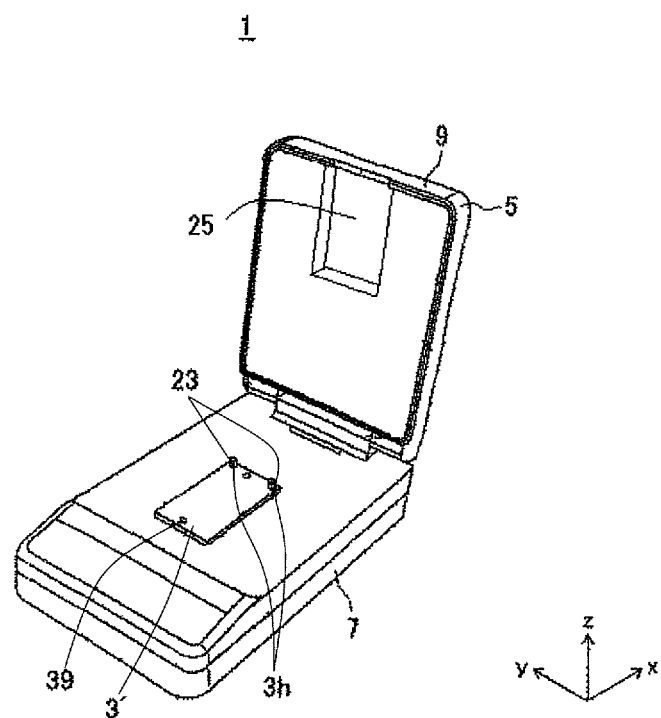
FIG. 13 is a perspective view illustrating a specimen liquid sensor apparatus according to another embodiment in an open state.

As shown in FIG. 13, a specimen liquid sensor 3' may be mounted inside of the reader 5 so as not to be exposed to the outside of the reader 5 in the closed state. According to this configuration, the influence of the external environment at the time of measurement can be reduced.

DESCRIPTION OF THE REFERENCE NUMERAL

1: Specimen liquid sensor apparatus
2: Connection component
3: Specimen liquid sensor
5: Reader
7: First portion
9: Second portion
9a: First protrusion portion
9b: Second protrusion portion
9c: Notch
21: Connection terminal
22: Circuit terminal
23: Positioning pin
24: Guide member
25: Temperature adjusting unit
26: Display unit
29: Terminal holding member
31, 31': External terminal
32: Sensor unit
35: Flow path
42: Through hole
43: Base body

The invention claimed is:

1. A specimen liquid sensor apparatus, comprising:
    a specimen liquid sensor comprising an external terminal electrode; and
    a reader comprising:
        a fist portion comprising a connection terminal electrode;
        a second portion coupled to the first portion; and
        a temperature adjustment unit coupled to the second portion, wherein
            the specimen liquid sensor is configured to be located in a space between the first portion and the second portion, and
            the connection terminal electrode is configured to contact the external terminal electrode when the specimen liquid sensor is in the space.

2. The specimen liquid sensor apparatus according to claim 1, wherein:
    the specimen liquid sensor further comprises a positioning hole,
    the first portion further comprises a positioning pin, the positioning pin being fittable in the positioning hole when the specimen liquid sensor is in the space.

3. The specimen liquid sensor apparatus according to claim 1, wherein:
    the first portion and the second portion are partially or wholly separable, and
    The first portion is in direct contact with the specimen liquid sensor when the specimen liquid sensor is in the space.

4. The specimen liquid sensor apparatus according to claim 1, wherein the temperature adjustment unit is pressed against the specimen liquid sensor when the specimen liquid sensor is in the space.

5. The specimen liquid sensor apparatus according to claim 3, wherein the temperature adjustment unit is pressed against the specimen liquid sensor when the specimen liquid sensor is in space.

6. The specimen liquid sensor apparatus according to claim 1, wherein the temperature adjustment unit comprises a heat conduction sheet that has a higher thermal conductivity than the reader.

7. The specimen liquid sensor apparatus according to claim 1, wherein:
    the first portion further comprises a guide member,
    the guide member comprises a first terminal,
    the specimen liquid sensor further comprises a second terminal, and
    the first terminal is in contact with the second terminal when the specimen liquid sensor is in the space.

8. The specimen liquid sensor apparatus according to claim 1, wherein:
    the specimen liquid sensor further comprises:
        a base body comprising:
            an upper surface; and
            a lower surface opposite to the upper surface;
        a cover on the base body;
        a flow path in between the upper surface and the cover; and
        a sensor unit in the flow path and on the upper surface of the base body, and
    the external terminal electrode is located on the lower surface of the base body.

9. The specimen liquid sensor apparatus according to claim 8, wherein the temperature adjustment unit is indirect contact with the cover.

* * * * *